United States Patent [19]

Sefidvash

[11] Patent Number: 5,581,790

[45] Date of Patent: Dec. 3, 1996

[54] DATA FEEDER CONTROL SYSTEM FOR PERFORMING DATA INTEGRITY CHECK WHILE TRANSFERRING PREDETERMINED NUMBER OF BLOCKS WITH VARIABLE BYTES THROUGH A SELECTED ONE OF MANY CHANNELS

[75] Inventor: Khorvash Sefidvash, Laguna Niguel, Calif.

[73] Assignee: Unisys Corporation, Blue Bell, Pa.

[21] Appl. No.: 253,436

[22] Filed: Jun. 7, 1994

[51] Int. Cl.$^6$ .................................................. G06F 13/00
[52] U.S. Cl. .................. 395/854; 395/185.01; 395/858
[58] Field of Search .................................. 395/854, 853, 395/280, 842, 824, 838; 371/57.1

[56] References Cited

U.S. PATENT DOCUMENTS

| | | | |
|---|---|---|---|
| 3,748,650 | 7/1973 | Garcia et al. | 395/838 |
| 4,209,841 | 6/1980 | Bambara et al. | 395/854 |
| 5,170,469 | 12/1992 | Sako et al. | 395/854 |
| 5,199,105 | 3/1993 | Michael | 395/842 |
| 5,287,476 | 2/1994 | Keener et al. | 395/824 |
| 5,335,328 | 8/1994 | Dunn et al. | 395/853 |
| 5,416,908 | 5/1995 | DiCarlo et al. | 395/854 |
| 5,434,872 | 7/1995 | Petersen et al. | 371/57.1 |
| 5,452,432 | 9/1995 | Macachor | 395/842 |
| 5,455,913 | 10/1995 | Shrock et al. | 395/280 |

*Primary Examiner*—Thomas C. Lee
*Assistant Examiner*—Duo Chen
*Attorney, Agent, or Firm*—Alfred W. Kozak; Mark T. Starr; Steven R. Petersen

[57] ABSTRACT

Multiple numbers of "sets" of sender-receiver units operate concurrently to transfer blocks of data. The number of blocks to be transferred in each set is predetermined by a main host computer which registers the number-of-blocks-to-be-transferred into a protocol-controller in each set of sender-receiver units. An associated data feeder control system monitors the number of data blocks residing in a buffer memory, which has dedicated storage for each sender-receiver unit, and will only permit data block transfer to receiver units only to the amount presently available in the buffer memory until, eventually, the predetermined number of data blocks, for each set, is transferred to completion.

6 Claims, 7 Drawing Sheets

DATA FEEDER CONTROL SYSTEM FOR PERFORMING DATA INTEGRITY CHECK WHILE TRANSFERRING PREDETERMINED NUMBER OF BLOCKS WITH VARIABLE BYTES THROUGH A SELECTED ONE OF MANY CHANNELS

FIELD OF THE INVENTION

This disclosure relates to digital data transfer systems wherein means must be provided for the control and counting of the amount of data transferred between digital modules.

REFERENCES TO RELATED APPLICATIONS

This case is related to U.S. Ser. No. 08/255,519, entitled "MULTI-CHANNEL INTEGRITY CHECKING TRANSFER SYSTEM FOR CONTROLLING DIFFERENT SIZE BLOCK TRANSFERS WITH ON-THE-FLY CHECKOUT OF EACH WORK AND DATA BLOCK TRANSFERRED", which issued as U.S. Pat. No. 5,517,615, and is included herein by reference.

BACKGROUND OF THE INVENTION

A basic operational function of systems involving digital modules has to do with transfer of data between various of the digital modules. Problems arise in regard to the accounting for and making sure that a specified amount of data has been transferred and has been transferred on a reliable basis with integrity.

Figure 2A:
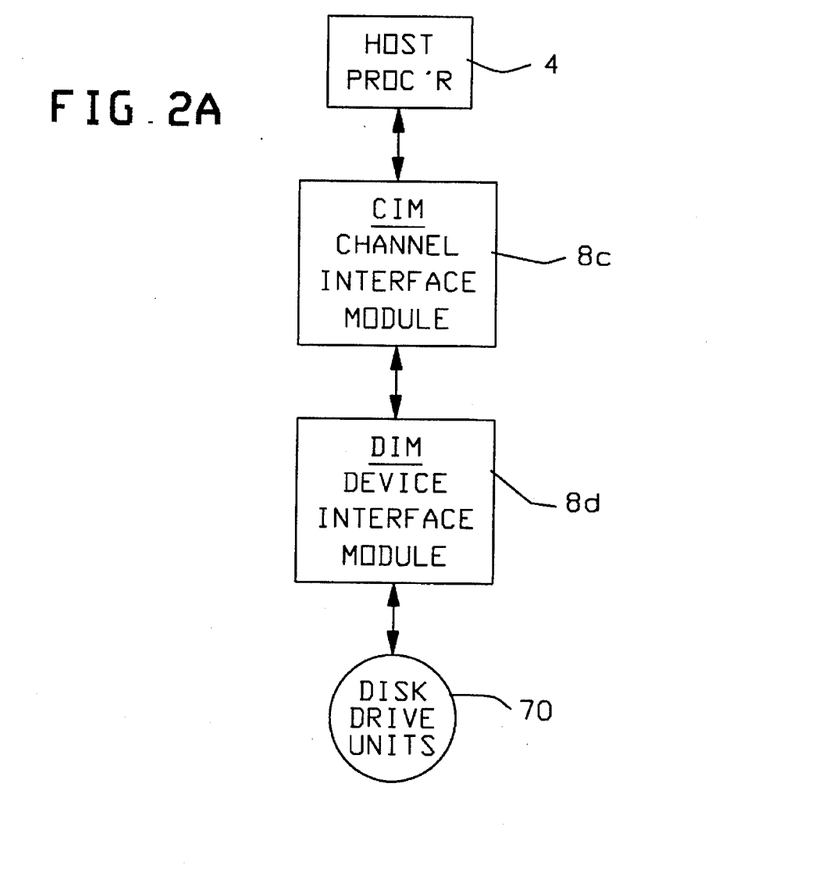
FIG. 2A is a drawing showing the overall network of operations between a host computer through a channel interface module to a device interface module over to disk drive peripheral devices.
Figure 2B:
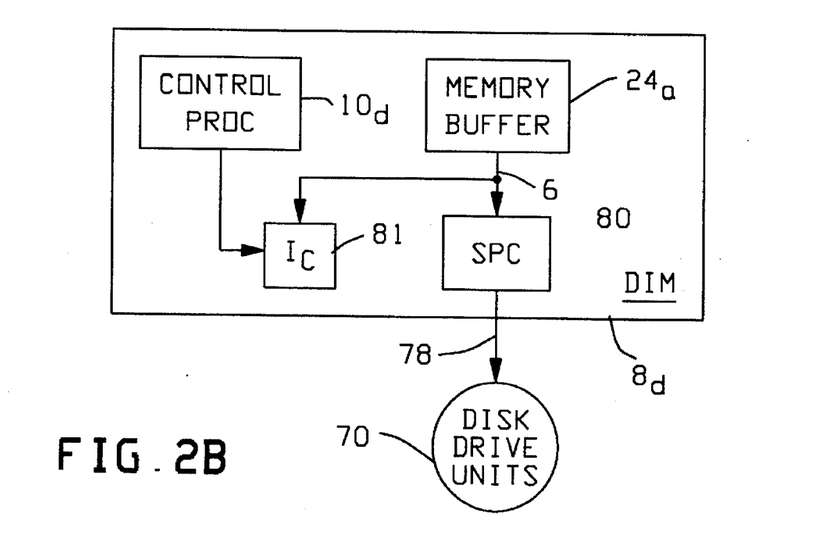
FIG. 2B shows how the integrity circuit connects to the bus between a sending and receiving module.

As seen in FIG. 2A, there is indicated a block diagram of a data transfer system whereby data from a host processor 4 may be transferred to a channel interface module (CIM) $8_c$ and then transferred to a device interface module (DIM) $8_d$ from which the data can then be moved to one or more peripheral units such as the shown disk drive units 70. FIG. 2B indicates the DIM $8_d$ with a protocol bus 6 connecting a buffer $24_d$ to a Protocol Controller 80 with an integrity circuit 81 (Ic).

Figure 2C:
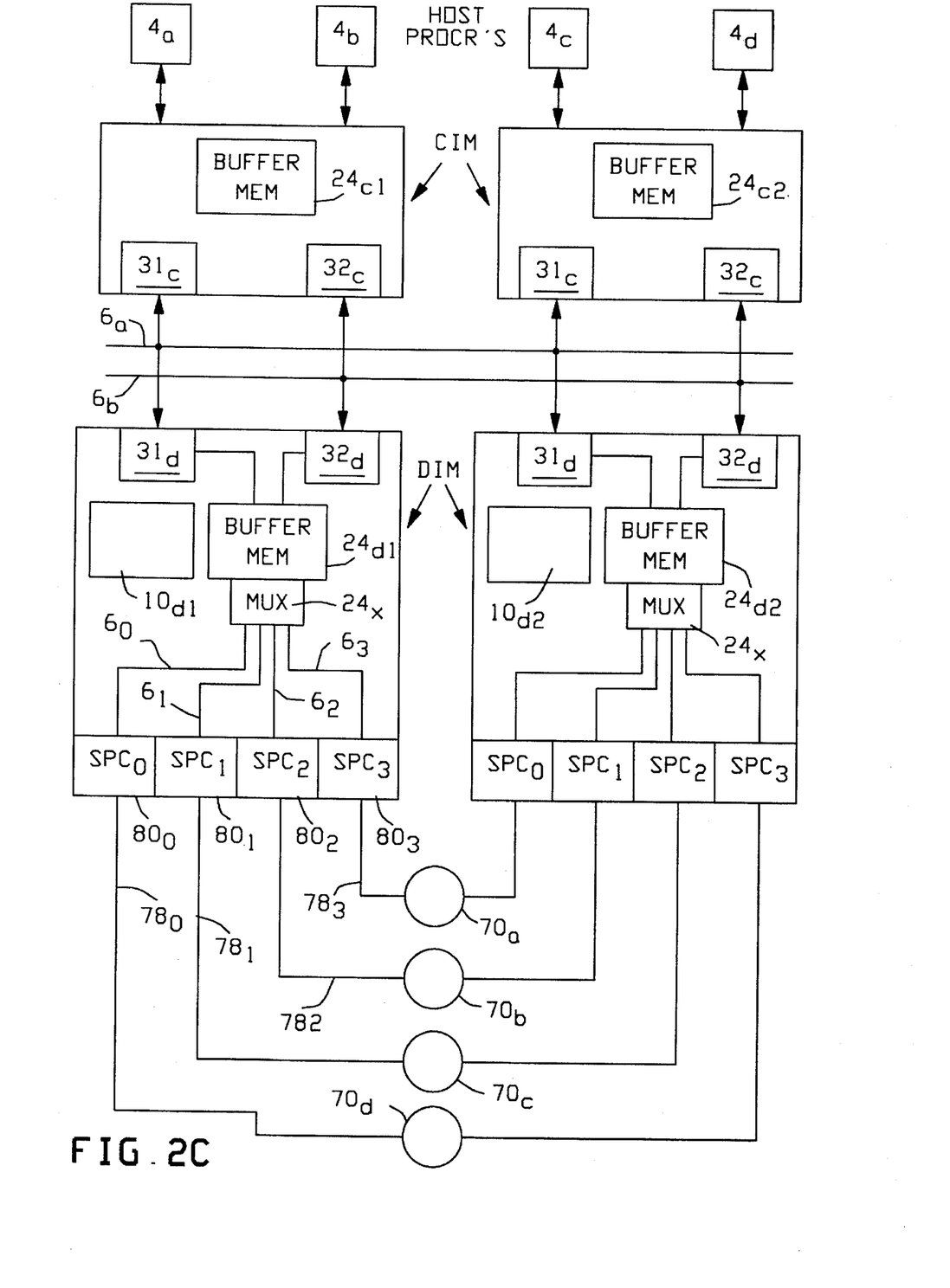
FIG. 2C is a more detailed diagram of the overall system whereby multiple numbers of host computers can communicate with multiple numbers of channel interface modules (CIM) connecting dual system busses which feed to multiple numbers of device interface modules (DIM) in order to provide data communications to and from multiple numbers of peripheral devices.

Then, in a more detailed version in FIG. 2C, a system can be provided wherein multiple numbers of host processors, 4a ... 4d, are connected to multiple numbers of channel interface modules (CIM) each of which are connected to dual system busses $6_a$ and $6_b$ which then can connect to multiple numbers of device interface modules (DIMs) $8_d$ each of which provides four ports as input/output ports to a plurality of peripheral units such as the disk drive units 70 ($70_a$ ... $70_d$).

Figure 3A:
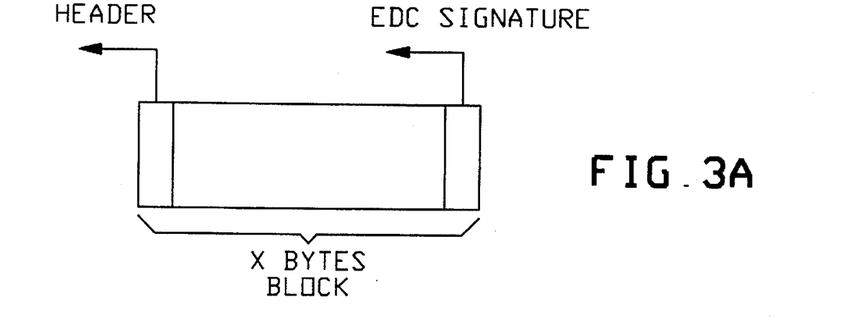
FIGS. 3A and 3B are drawings to indicate the different size of data blocks to be transferred.

As seen in FIG. 3A, a block of data composed of "X" bytes will have a header portion which will provide the address and destination with commands and include information as to the size of the block. After the header, there is present the main bulk of the data which is followed by a signature portion designated as the error detection code (EDC) signature. This has been provided to the block of data in order to characterize a value which represents the value of the data being transmitted in the main block.

Figure 3B:
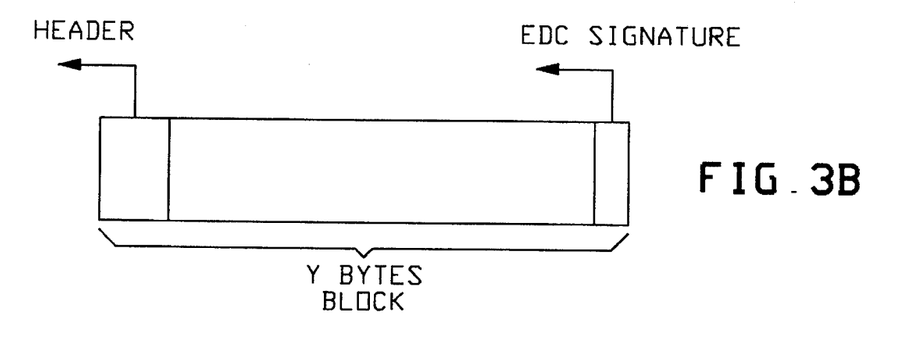

Subsequently, as seen in FIG. 3B, there may be data block transfers of a different volume or size as shown by the block designated "Y" bytes. Here again the header will provide the address destination, commands and other pertinent data after which the main body holds the data to be transferred followed by the EDC (error detection code) signature which characterizes the data being transferred.

Figure 4:
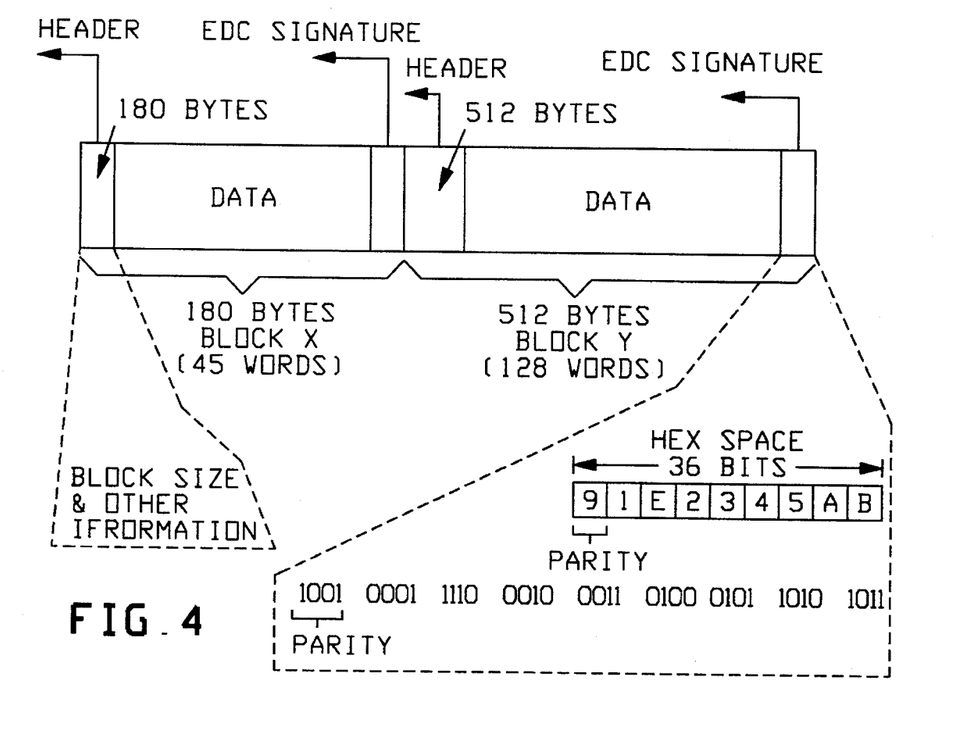
FIG. 4 shows a more detailed view of the data blocks indicating the information provided in the header and information provided in the final portion of the block as the EDC signature areas.

When a block of data such as that of "X" bytes or "Y" bytes is being transferred, it is necessary not only that some means be provided to recognize the block size and to insure the integrity of the data transfer but that the entire specified number of bytes in each block and the number of specified blocks, has been transferred. As seen in FIG. 4, there is shown an example of two different block sizes which are to be transmitted between a sending and a receiving digital module, the first block size being of 180 bytes and having header and EDC signature. This is followed by a larger block size of 512 bytes which also has its own personal header and EDC signature.

The presently described system operates to insure that there will be no delay in the data transfer operation even though blocks of different sizes are being transferred and additionally, that the different block sizes will concurrently and on-the-fly be checked for integrity without any delay to the data transfer operation and that the specified proper number of blocks be transferred.

As seen in FIGS. 2B, 2C, the device interface module $8_d$ (DIM) which is used to carry data to peripheral units such as a disk drive unit 70, will be seen to have certain functioning modules which enhance the transfer of data to the peripherals while at the same time providing for reliability in the data transfer operation by checking the integrity via $I_c$, 81, FIG. 2B, of the data being transferred. As seen in FIGS. 2B, 2C data which has been passed down from the channel interface module $8_c$ (CIM) and which temporarily resides in the memory buffer $24_d$, will then be passed on bus 6 to SCSI Protocol Controller SPC 80, which will provide the management for transferring the data on bus 78 to a selected group of disk drives 70. The drives 70 may represent a multiple number of peripheral units which can receive blocks of data or send blocks of data.

As seen in FIG. 2B, the bus 6 between the memory buffer $24_d$ and the protocol controller SPC 80 is also connected to an integrity circuit $I_c$ 81. The integrity circuit 81 functions on-the-fly in order to check the integrity of the data being transferred. A control processor $10_d$ provides initiation signals to the integrity circuit 81 so that it may provide its error checking function.

As illustrated in FIGS. 3A, 3B, blocks of data to be transferred can occur in different block sizes. FIG. 4 illustrates where each header of a block contains information as to the size of the block by denoting the number of bytes involved in the block. Then, after the pertinent data in the block is transmitted, the final portion of each block is seen to have an Error Detection Code (EDC) signature. This signature involves a Hexadecimal Code of, for example, nine bytes (36 bits) of which the first byte is a parity value.

Thus, in addition to checking the integrity of the data being transferred, there is also the problem of making sure that the entire block of data of, for example, 180 bytes or, for example, 512 bytes, has been transferred from one digital module to the other destined receiving digital module. The data feeder control $F_0$, FIG. 1A, (DFC) of the presently described system performs the function of making sure that only the valid blocks of data available in the memory buffer $24_d$ are transferred with integrity to the receiving module even though the host processor 4 has commanded a specific protocol-controller SPC 80 to transfer a larger total of "B" data blocks in total. In the case of a EDC error or a parity error, or in the case of all the bytes having been properly transferred from a sending module to the receiving module, then in that case, there is no more data available in the memory buffer for transfer. In each of these cases, the data feeder control (DFC) system will force a control logic unit so as to deny any further grants of protocol bus 6 to the protocol controller SPC 80.

SUMMARY OF THE INVENTION

A data feeder controller system $F_0$ (DFC) is used to manage and control the feeding of data from one digital module to another digital module and also to keep track of the amount of data available for transfer from the sending module to the receiving module.

In the present embodiment, data is transferred between a memory buffer, for example, as a first sending module over a channel bus to a receiving module designated as a SCSI Protocol Controller, SPC 80 which then transfers the data to a group of peripheral units, such as disk drives 70.

During the course of the data transfer, an integrity circuit (81) checks each word transferred for its parity value and also checks the entire block with an error detection code to make sure the integrity of the data block transferred has been properly fulfilled. Should an error in the parity of a given word occur or should an entire block be finally transferred with any EDC signature error, then the data transmission is interrupted by means of denying any further bus grants for data transfer operations on that set of sender-receiver modules.

During the time that the various data blocks are being used to transfer data words and data bytes are moving from one sending module to a receiving module, at the same time there is provided a data feeder control (DFC) system which keeps track of the number of blocks which are properly transferred between the first sending module and the second receiving module, and the amount of data remaining to be transferred.

Figure 1A:
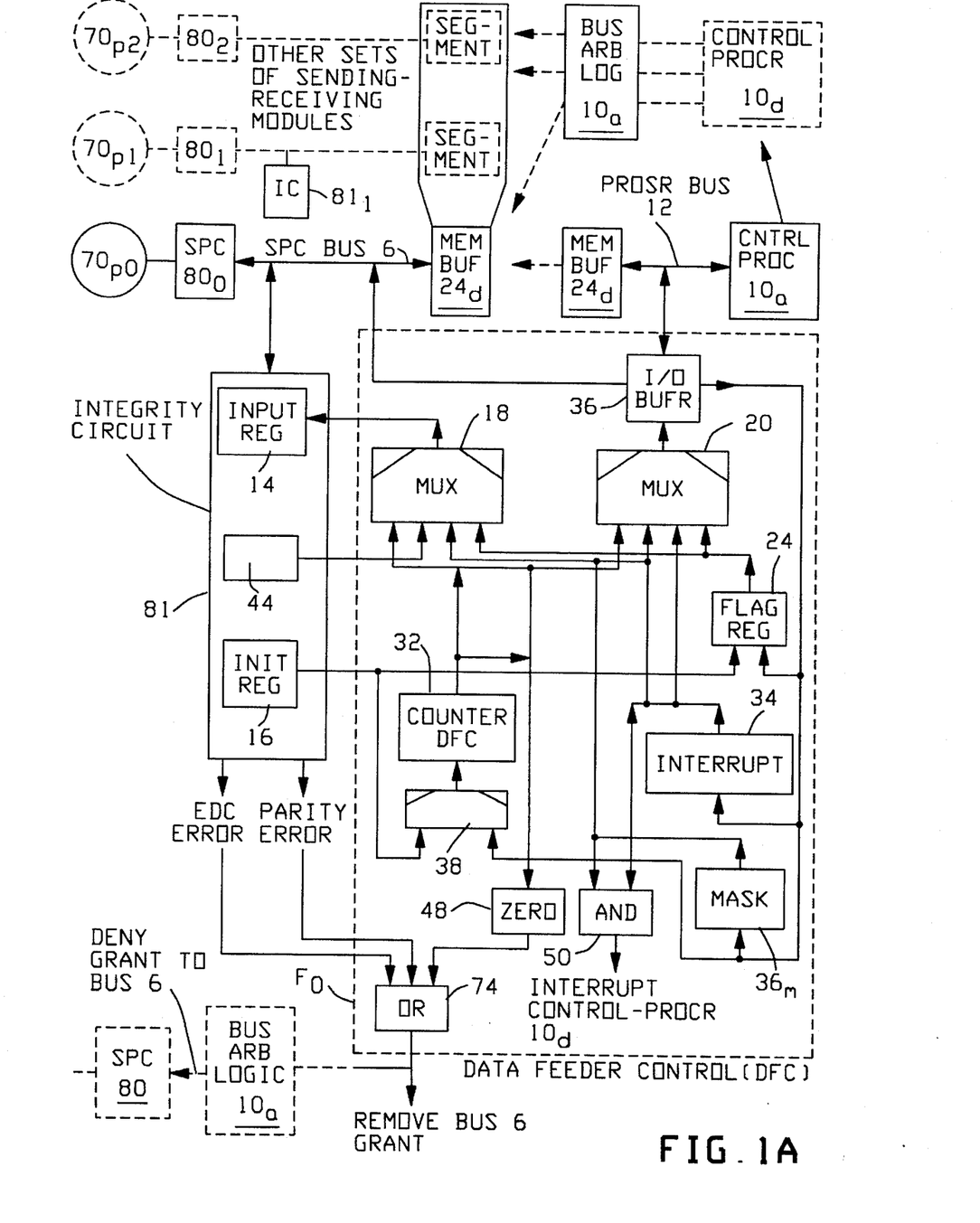
FIG. 1A is a drawing showing an integrity data transfer system which is monitored by a data feed controller.
Figure 5:
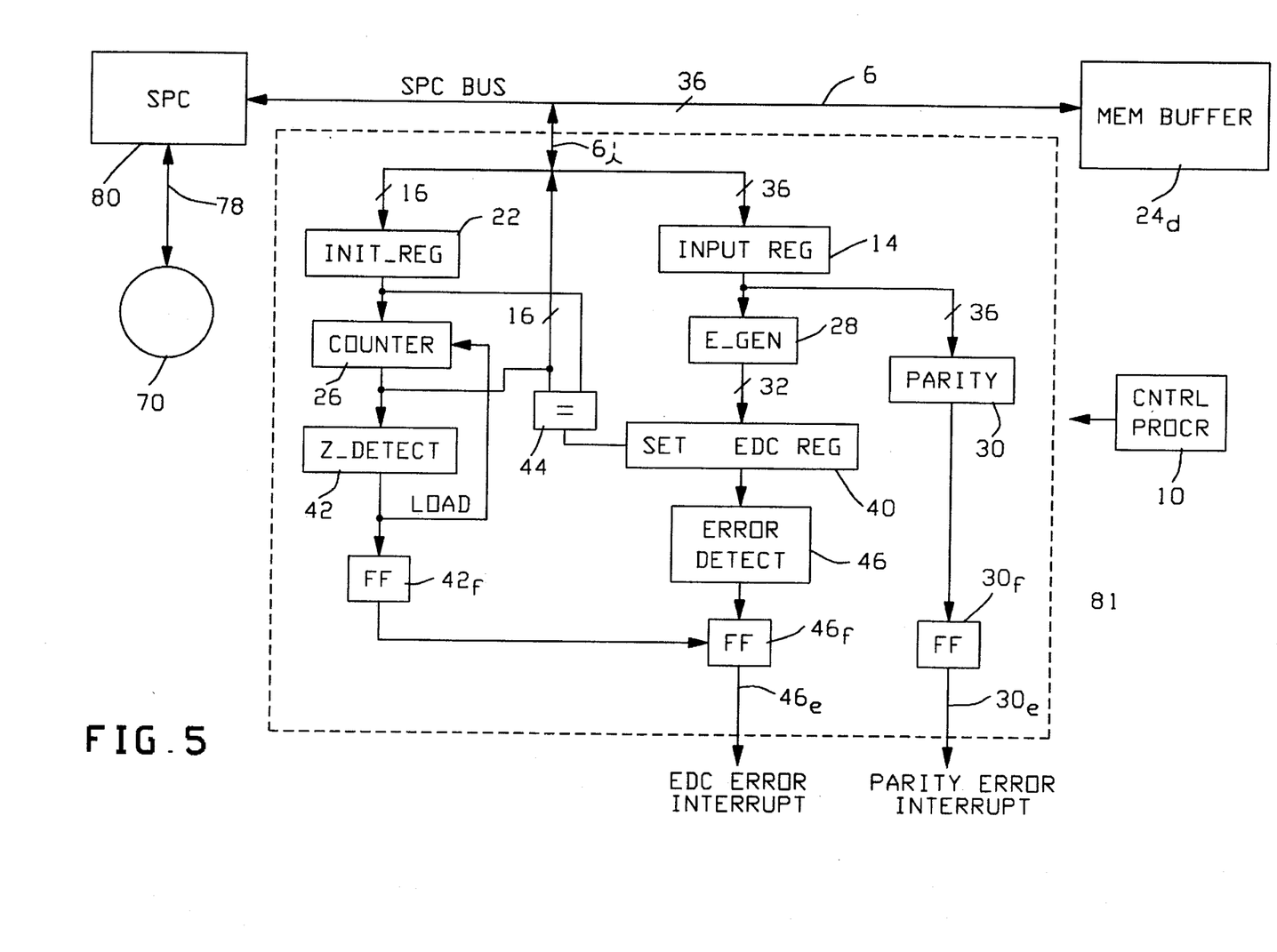
FIG. 5 is a drawing showing one set of sending and receiving modules connected by a channel bus onto which is fixed an integrity checking circuit.

A device interface module (DIM) control processor $10_d$, FIG. 1A, is connected to a processor bus 12 which enables the processor $10_d$ to communicate through an input register-buffer 14, FIG. 5, and through a I/O buffer 36, FIG. 1A, to a multiplexor 20 which is connected to a flag register 24. The multiplexor 20, FIG. 1A, also receives outputs from an interrupt register 34, a mask register 36 and a counter feeder control unit 32 which keeps track of the number of blocks of data that are being transferred between the sending digital module and the receiving digital module over on the protocol bus 6.

The Data Feeder Controller system $F_0$ is initialized by the Protocol Controller, SPC 80, at the start time which registers the amount of data which is available for transfer in the memory buffer $24_d$. The Data Feeder Controller system tracks the number of data blocks transferred between the first sending and second receiving module for each set of sender-receiver modules.

When the counter feeder controller 32 (which has been set with the proper number of blocks to be transferred), reaches it set limit, it halts transfer until the DIM updates the value of the counter 32 (FIG. 1A)—to indicate how much more data is now available for transfer.

DESCRIPTION OF PREFERRED EMBODIMENT

Referring to FIG. 1A, there is seen the example of an interconnecting protocol controller channel bus 6 which connects two digital modules, the SPC 80 and the memory buffer $24_d$. Data can be transferred in either direction between these digital modules where one module is a sending module and the other module is a receiving module. Each set of such sending-receiving modules is controlled by a processor-controller $10_d$.

Connected to the protocol channel bus 6 is an integrity circuit 81 which is described in more detail in connection with FIG. 5. The integrity circuit 81 checks each word that is transferred for parity errors and also checks the entire block with an error detection code (EDC) signature to sense whether the entire block has been transferred with integrity. Should there be an error in parity or an error in the EDC signature comparison, then this is sensed through an OR gate 74 which initiates bus arbitration logic 10a to deny any further bus grants on the protocol controller channel bus 6 for any specified set of sender-receiver modules.

In conjunction with the data transfer between the first and second digital modules together with the integrity checking circuitry, the data feeder control (DFC) system provides a method for measuring the number of bytes and number of blocks of data which are to be transferred.

The initialization register 16 (FIGS. 1, 5) which reads the header of any given block in order to ascertain the number of bytes (in the block) to be transferred will also inform and set a counter 32 through the multiplexor 38 (FIG. 1A).

An I/O buffer 36 connected to the control-processor bus 12 will monitor and inform the counter 32 (through multiplexor 38) as to the data that the DIM controller-processor $10_d$ intends to have transferred between the first sending and second receiving modules. The I/O buffer 36 and the initialization register 16, under certain conditions, will provide signals to a flag register 24, an interrupt register 34 and a mask register $36_m$.

As seen in FIG. 1A, an output from the interrupt register 34 or an output from the mask register $36_m$ can be fed to the AND gate 50 to trigger an output which will interrupt the control-processor $10_d$ operation.

Also, it will be noted that when the counter 32 reaches its preset limit, that is to say, the proper number of data bytes and data blocks have been transferred, this will activate the zero flip-flop 48 which can then work through the OR gate 74 to remove the grant of access on the protocol controller channel bus 6 for any specified set of sender-receiver modules.

Outputs from the memory buffer $24_d$, the interrupt register 34 and the mask register $36_m$ are also conveyed to the multiplexor 20 and also to the multiplexor 18. In this fashion, the output of the flag register 24, the output of the interrupt register 24, and output of the interrupt register 34 and the output of the masking register $36_m$ can be conveyed through the multiplexors 20 and 18 to the processor bus 12 and to the protocol channel bus 6 in order to stop data transfer operations on those busses, by removing the bus grant.

In the data feeder control (DFC) system described herein, the counter feeder controller 32 can be set with the number of bytes or number of data blocks which are available (in buffer memory $24_d$) between the appropriate sending-receiving modules.

The control processor $10_d$ through its processor bus 12 can communicate with the protocol controller channel bus 6 or multiple numbers of such protocol controller channel busses such as may occur in a device interface module (DIM) which may have up to four such protocol control busses, $78_0$, $78_1$, $78_2$, $78_3$, (FIG. 2C). The control processor $10_d$ can use the I/O buffer 36 (FIG. 1A) to communicate to flag register 24, the interrupt register 34 and the mask register $36_m$ in order to flag errors or to interrupt data transfers on a given protocol channel bus 6 or to mask out the use of the integrity checking system when data is being transferred without an EDC signature.

The Data Feeder Controller system (DFC seen as $F_0$, FIGS. 1A, 1B) 15 thus used to manage the feeding of data between a group of sending modules to group of receiving modules using a group of associated protocol control channel busses 6 and, in so doing, to keep track of the number of bytes and blocks transferred between each sending module and each receiving module.

Figure 1B:
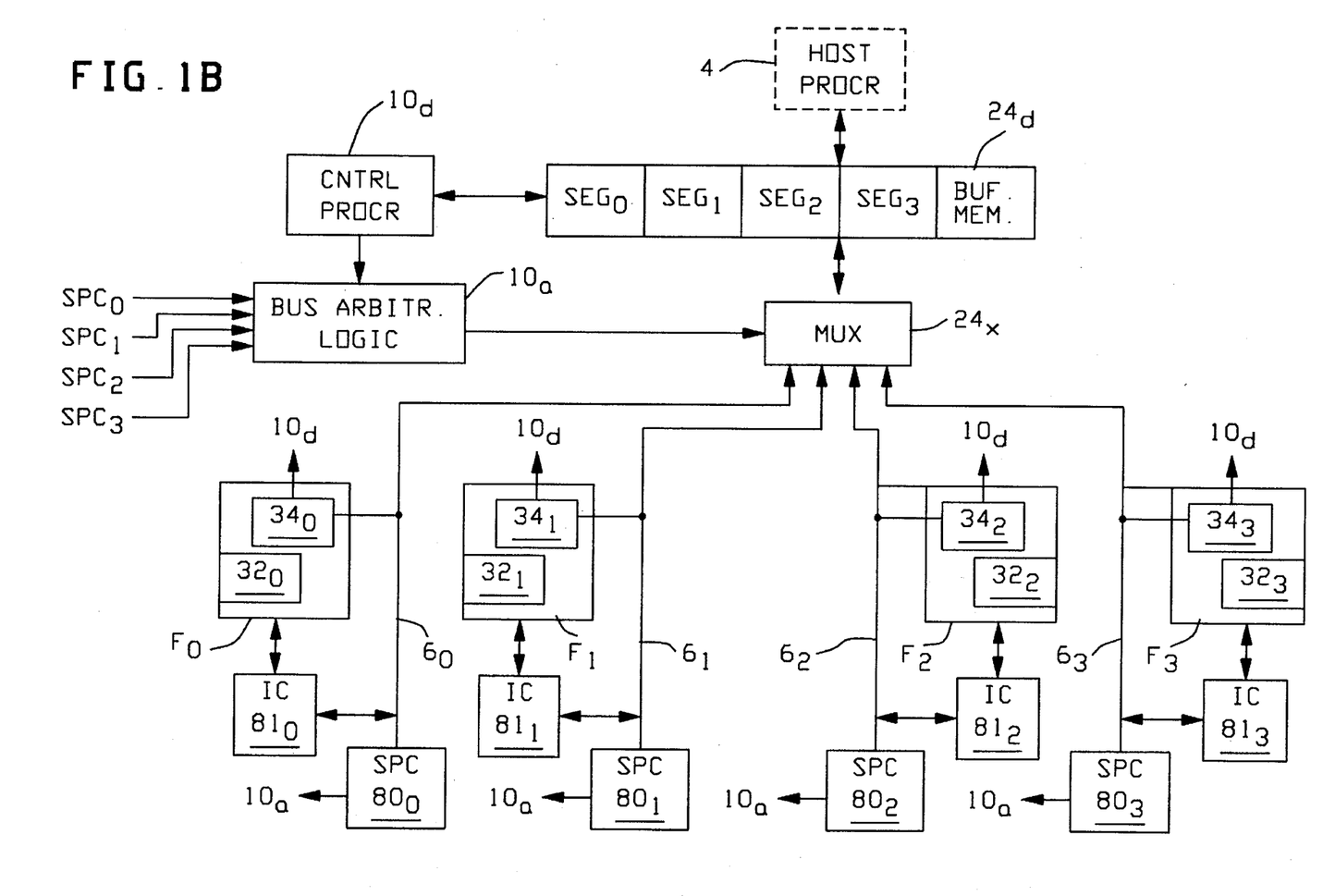
FIG. 1B shows how a data feeder controller is operative on each channel bus.

As seen in FIG. 1B, there may be multiple numbers of protocol controller busses ($6_0$, $6_1$, $6_2$, $6_3$) connected to multiple numbers of sending/receiving modules ($80-24_d$). Each time a selected set of these sending/receiving sets are used, the counter 32 is set to indicate the number of bytes in a data block to be transferred. When after this data transmission, the counter reaches zero to indicate completion, then the control-processor $10_d$ will choose another set of sender-receiver bus units for data transfers at which time the counter will be reset to a new number to indicate the bytes and the data blocks to be transferred.

When all the available data is transferred, the counter feeder controller 32 will indicate a zero via flip-flop 48, FIG. 1A, and then, it will remove the bus grant from the SPC 80 to stop further usage because there is no more valid data available in the buffer $24_d$. At the same time, counter feeder controller 32, FIG. 1A, will set 1 bit in the interrupt register 34 for the controller processor $10_d$ to determine the source of the interrupt at a later time, and it (32) will interrupt the control processor $10_d$.

Thus, with this notification, the DIM control processor $10_d$ can then determine when the memory buffer $24_d$ must be supplied with more data so that more data is available for data transfer operations. Likewise, the DIM processor $10_d$ can also then focus on selecting another one of the multiple protocol channel busses for data transfer operations between another set of sending-receiving modules.

As more data becomes available in the memory buffer $24_d$, then the DIM control processor $10_d$ will set the counter 32 and also a "data pointer" which is specific to each set of sender-receiver units in order to indicate how much data must be transferred as of a given time. Thus the device interface module $8_d$ will continuously be capable of keeping a supply of data (in its memory buffer $24_d$) to be transferred on protocol channel busses 6.

The device interface module $8_d$ keeps an identification or ID register to determine, at any given time, as to which device or sending-receiving set in the system is actively processing the transfer of data. A pointer is held in the SCSI Control Processor 80 regarding data in the memory buffer $24_d$. If an identification number ID found by the processor controller $10_d$ matches with the given protocol-controller SPC 80 that the control-processor wants to update, the processor $10_d$ reads the value from the SPC pointer and calculates the new value of the pointer based on the amount of data that has accumulated in the main memory buffer $24_d$. Then, the SPC pointer is updated and the channel bus 6 is released for use by the protocol controller SPC 80.

In cases where an active device identification (ID) from the control processor $10_d$ does not match with the device ID (which the DIM processor wants to update), then the DIM processor controller $10_d$ will read a "Save Table" (in buffer memory $24_d$) for the ID of the device which is requested. At this point, the processor-controller $10_d$ can calculate the new value and update the Save Table so that the Save Table can then be used by the SPC 80 when that particular set of sender-receiver units becomes active again.

Referring to FIG. 1B, each channel bus $6_0$, $6_1$, $6_2$, $6_3$, is seen to have a Data Feeder Control (DFC) Circuit $F_0$, $F_1$, $F_2$, $F_3$) is which abstractly shown with a counter ($32_0$, $32_1$, $32_2$, $32_3$ which is preset with the number of blocks of data to be transferred between a SPC ($80_0$, $80_1$, $80_2$, $80_3$) and a dedicated segment in buffer memory $24_d$. Additionally, each DFC circuit is indicated to have an interrupt register ($34_0$, $34_1$, $34_2$, $34_3$) which will send an interrupt to control processor $10_d$ when, for example, the I/O transfer cycle is completed or if there was an EDC error.

The bus arbitration logic $10_a$, seen in FIG. 1A, will insure that each channel bus 6 gets equal time periods of access for data transfer operations. Alternatively, the control processor can be programmed to give access to a requesting SPC 80 when other of the SPCs are idle.

An expanded view of one set of sender-receiver modules of the Device Interface Module (DIM) used for integrity checking is shown in FIG. 5 wherein a memory buffer $24_d$ is connected by means of a channel bus 6 over to a SCSI Protocol Controller SPC 80. The protocol controller 80 connects the bus 78 (FIG. 2B) to peripheral units, such as disk units 70.

Attached to the protocol controller bus 6 is seen (FIG. 5) an auxiliary connecting bus $6_i$ which connects to two registers 22 and 14. The initialize register 22 and the input register 14 both function simultaneously to initialize the integrity checking circuit 81 and to store a duplicate of each data word (36 bits) being transferred on the protocol controller bus 6. Each word is placed momentarily in input register 14.

The initialize register 22 will also indicate the "size" of the block of data being transferred. The input register 14 makes a copy of each data word in the entire block. The input register 14 looks at each block and creates a internally generated signature. The purpose of this is to compare the original EDC signature provided at the end of each block (FIG. 4) with the locally internally generated EDC signature by register 14.

The counter 26 is used to count the number of data words transferred between the two digital modules $24_d$ and 80. The SCSI Protocol Controller, SPC 80, loads the "size" of the data block into the initialize register 22 before the data transfer. When the counter 26 reaches its set limit, the data in the initialize register 22 is loaded into the block counter 26 to indicate the block size for the "next" block transfer on the present channel bus or on another channel bus 6.

The Protocol Processor, SPC 80, can read the initialization register 22 in order to save its content when it switches to data transfers of a different block size. Additionally, the SPC 80 can restore the old value of the block counter 26 by writing into these registers.

The initialization register 22 is programmable by the SPC 80 dynamically. The SPC 80 has a processor which loads the data block size into the initialization register 22 before the data transfer. When the block counter 26 reaches its set limit, then the initialization register 22 data on block size is loaded into the block counter 26 for the next block transfer. This is done when the zero detector circuit 42 senses when the counter 26 has reached its limit (zero) and thus permits a reloading of the counter.

A block size comparator 44 (FIG. 5) is used to check the block size on the bus 6 with the block size counted by the counter 26.

The output of the block size comparator 44 is used to set the error detection code (EDC) register 40 if the original EDC value does not match the internally generated EDC code.

The output of the zero detector 42 is fed to a pipeline flip-flop $42_f$ which is used to set the flip-flop $46_f$, which is the error detection code (EDC) error flip-flop. The flip-flop $42_f$ can only set up the flip-flop $46_f$ after the zero detector 42 has reached its zero value.

The data input register 14 is fed to the EDC generator 28 and also to parity checking circuit 30. The parity checking 30 checks for proper parity of each data word being transferred and if a parity error is detected, will initiate flip-flop $30_f$ to generate a parity error interrupt signal $30_e$ as the particular word is undergoing transfer.

The EDC generator 28 generates an internal EDC signature for the data being transferred which is then compared to the original EDC signature sent along with the originally transmitted data. The output of generator 28 is placed in the EDC register 40. From this, the error detection circuit 46 can detect whether there has been an EDC error detected or not. If so, then the flip-flop 46 is initiated in order to provide a EDC error interrupt signal on line $46_e$.

In the presently described embodiment, the initialize register 22 and the block counter 26 are 16 bytes wide. Thus, the maximum size allowed is 65,536 words of 36 bits each. When an error is detected by the error detection unit 46 or parity error checker 30, then respectively, the JK flip-flop $46_f$ and the JK flip-flop $30_f$ are set by the hardware and latched into an interrupt register for the main processor to which the system is attached.

The two flip-flops $46_f$ and $30_f$ can be reset by the control processor $10_d$ by addressing the flip-flop and performing a write operation on it. The interrupt bit of the interrupt register in the control processor $10_d$ will be reset on the next clock.

It may again be noted that the EDC error checking system and the parity error checking system can be "disabled" by the SPC 80 during initialization or when data blocks "without EDC signatures" are being transferred. In normal operation with EDC signatures, the system will allow the reporting of interrupts when the EDC error or parity error occurs.

The sequence of operation when data is being transferred from the memory buffer $24_d$ over to the SCSI Protocol Controller 80 will operate as follows. The initialize register 22 will receive data to sense the size of the block (a block of "X" bytes or a block of "Y" bytes).

The input register 14 simultaneously copies word by word, the data of the entire block. The final EDC internally generated original signature generated from circuit 28 is placed in the EDC register 40 and is compared with original EDC signature residing in comparator 44. If these match, then there has been no EDC error. On the other hand, if these do not match, then the error detection circuit 46 will activate the EDC error interrupt flip-flop $46_f$ in order to send a interrupt signal on line $46_e$. Thus, the signature generated in the EDC generator 28 is put in the EDC register 40 for comparison with the original EDC signature. The comparison circuit 44 compares the two signatures and determines whether an EDC error has occurred.

When a new block of data of a different size is subsequently being transferred, then the initialize register 22 will read the "first word" in order to tell the block size of the data block being transferred.

Figure 6:
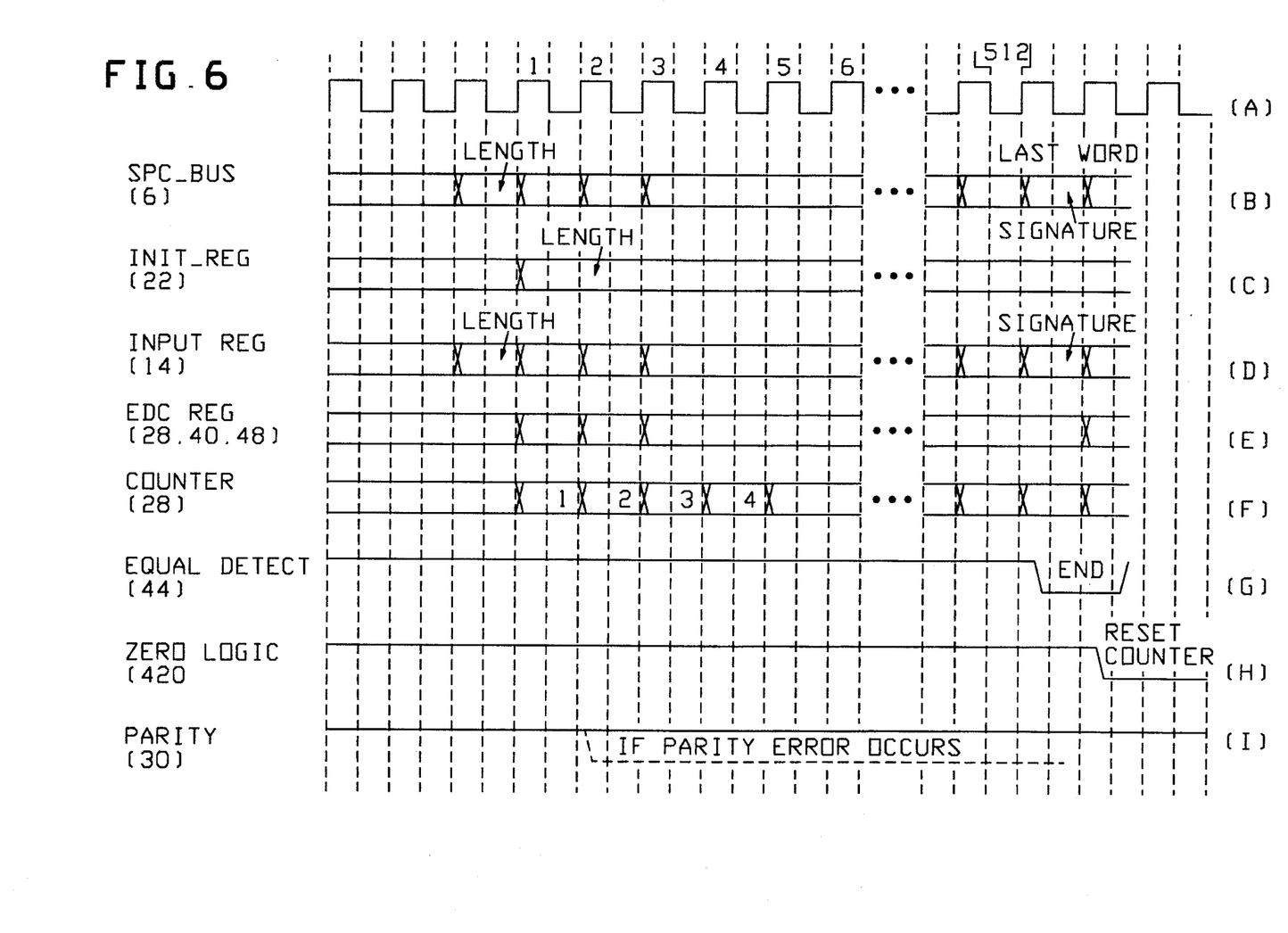
FIG. 6 is a timing diagram showing the clock cycles and functions performed during data transfer of a specified data block on a channel bus.

Referring to FIG. 6, there is illustrated a timing diagram of the sequence of functions involved.

Line A is illustrative of the timing clock signals.

Line B shows data on the SPC bus 6 (clock 1 where the first word indicates the block size as being, for example, 512 bytes). Then on each succeeding clock 2, 3, 4, etc. another word (36 bits) is transferred until, at clock 510, the original EDC signature is transferred. FIG. 4 shows a typical example of an EDC signature.

Line C indicates how the initialization register 22 will copy each data word being transferred on SPC bus 6.

Line D indicates how input register 14 also copies each data word from the SPC bus 6, in order to generate and accumulate an internal EDC signature.

Line E shows how the EDC generator 28 works to generate a new code value for each word on each clock until, at clock 512, the complete internally generated EDC is completed and to be placed in EDC register 40. At clock 512, this internally generated EDC will be compared to the original EDC signature in register 44 (FIG. 5). If there is a mismatch, then error detector 46 will flag the processor via flip-flop $46_f$.

Line F indicates how the counter 26 (FIG. 5) counts down each byte from its original setting of 512 bytes. The counter 26 was originally set to 512 (bytes) by the initialization register 22 which received information on the length (512) of the block (block size).

The zero detector circuit 21 (FIG. 5) indicates when the 512 bytes of data have been transferred between digital modules, i.e. the end of the data block transfer.

Line G illustrates how the EDC comparison register 44 operates to signal a "match" or "mismatch" after clock 512. Any word which does not check out in parity (as per the dotted line after word 1) will interrupt the control processor $10_d$ as seen in Line I.

Line H indicates how the zero detector circuit 44 will reset counter 26 after clock 512.

Line I indicates how the parity check circuit 30 checks the parity of each word transferred on each clock 1, 2, 3, ... 512.

In the present system the memory, buffer $24_d$ has certain dedicated areas (Segments 0, 1, 2, 3), FIG. 1B, for each of the protocol controller channels. These dedicated areas may be designated $ID_0$, $ID_1$, $ID_2$, $ID_3$. Each of these provide information for the SCSI protocol controllers $80_0$, $80_1$, $80_2$, $80_3$.

The data feed control (DFC) system operates such that only data that is "presently available" in the buffer $24_d$ will be transferred to the peripherals attached to the protocol controller units, SPC 80.

For example, if the main host processor 4 commands that 100 blocks of data be transferred to the memory buffer $24_d$ and then from the memory buffer $24_d$ to a particularly designated peripheral unit 70, it should be understood that at certain times the buffer memory $24_d$ may not have 100 blocks of data in it but may have only 10 blocks or 20 blocks of data in it. Under these conditions, the DFC counter (32, FIG. 1A) monitors the situation so that if the buffer memory $24_d$ only has 10 blocks, then only 10 blocks will be permitted to be transferred from the buffer memory $24_d$ to the SPC 80 and then to the peripheral unit 70.

When adequate data has been transferred from the host processor 4 and the channel interface module $8_c$ to the memory buffer $24_d$, then the DFC counter 32 will permit data to be transferred on the protocol channel bus 6. So even though a particular SPC 80 has been commanded to transfer 100 blocks, it will only be permitted to transfer the number of blocks that are "presently residing" in the memory buffer $24_d$. The DFC Bus Arbitration Logic $10_a$ with its counter 32 will deny any further bus grants to a protocol channel bus 6 when all the available data in the buffer memory $24_a$ has been transferred.

The situation may be summarized as follows:

Step 1: Assuming there are 10 blocks in the buffer memory 24 and the SPC 80 is set to transfer 100 blocks as commanded by host 4. However, the counter 32 in the data feed controller (DFC) is set for 10 blocks only since that is the amount presently available in the memory buffer $24_d$. At this point the SPC 80 can start the transfer of data.

Step 2: During the period of earlier transfer of 10 blocks of data, the buffer has now received 10 more blocks of data from the main host computer 4. Here the controller-processor $10_d$ updates the counter 32 in the data feed controller (DFC) with the additional 10 blocks. Now the SPC 80 can continue to transfer the additional 10 blocks.

Step 3: The SPC 80 has now transferred the 20 blocks that were available in the memory buffer $24_d$. There has been no more data received in the buffer $24_d$. At this juncture, the DFC bus arbitration logic 10, will stop the SPC 80 from transferring any more data by removing the bus grant to bus 6.

Step 4: The channel interface module (CIM) passes on 20 more blocks from the host processor 4 over to the memory buffer $24_d$. The control processor $10_d$ will update the counter 32 in the ($F_0$, $F_1$, $F_2$, $F_3$) with an additional 20 blocks. Now the SPC 80 can start to continue transferring the additional available data in the buffer, that is to say, 20 more blocks.

These type of operations can continue for each of the four channels involving the four SPC 80 protocol controllers ($80_0$, $80_1$, $80_2$, $80_3$). The identification number (ID) sector in the memory buffer $24_d$ will keep track of the data being transferred on each channel. In each case, since there is only one counter 32 available for each set of sender-receiver modules, the DFC control counter 32 will be updated to reflect the count figure of data blocks to be transferred for each one of the channels as they are activated.

Described herein has been a data feeder control system which operates to control and regulate the amount of data between a multiplicity of sending-receiving modules which transfer data on a plurality of protocol channel busses. The data transferred on the protocol channel bus is checked for integrity in two ways. One way is a parity check for each word and the other is via an error detection code (EDC) for each block transferred.

The data feeder control (DFC) system recognizes the ID (Identification Number) of each data segment for each set of sending-receiving units and will set up a counter to count and regulate the number of data bytes and data blocks which are transferred on each set of sender-receiver units.

When the required number of data blocks have been transferred on any given set of sender-receiver units, the DIM processor controller $10_d$ can then set a number of data bytes or data blocks to be transferred between a different set of sender-receiver units.

During the occasions of multiple channel operations occurring on different sets of sender-receiver units, the termination of data transfers in a given set will indicate (through a flag register) to the processor controller $10_d$ that a certain number of data blocks have been completed on a certain set of sender-receiver units. This allows another set of sender-receiver units to be chosen for data transfer operations. Additionally, the processor controller $10_d$ can also enable more data to be transferred into or out of the memory buffer $24_d$ depending on what the requirements are at any given time.

While a preferred embodiment of the data feeder control system has been described, it should be understood that other circuitry and variations may be encompassed by the following claims.

What is claimed:

1. A data feeder and management system using a processor-controller means for controlling data transfers between a plurality of main host computers and a plurality of peripheral devices, said data composed of "B" blocks of "d" bytes which include an original error detection code (EDC) signature for each block, said system comprising:

(a) a memory buffer means for holding blocks of data being transferred between a main host computer and a specified peripheral device, said buffer means connected to said main host computers and including (i) dedicated segments for holding data being transferred to/from N peripheral devices on N channel bus means where each segment includes ID means for recording the amount "B" of data blocks to be transferred on each one of said N channel bus means; and (ii) means to transfer said data block amount of "d" bytes to an associated protocol controller means;

(b) a plurality N of said protocol controller means, each protocol controller means having a channel bus means connected to said memory buffer means via a selecting multiplexer means, each said protocol controller means connecting to a peripheral device which can receive or send data;

(c) said processor-controller means for tracking the number of data blocks transferred on each one of said N channel bus means, said processor-controller means including channel bus arbitration means for enabling said selecting multiplexer means to select one of said channel bus means for data transfer;

(d) a plurality of N Data Feeder Control means, each Feeder Control means attached to an associated channel bus means and including:
   (d1) counter means for registering when the number of data blocks transferred has reached the amount of "B";
   (d2) interrupt means to remote accessibility to the associated channel bus means which has successfully transferred "B" blocks of data by signalling said processor-controller means;

(e) a plurality of N integrity checking circuit means, operating directly on-the-fly during data transfers on said channel bus means, each said integrity circuit means attached to one of said channel bus means and including:
   (e1) means to parity check each byte of data transferred;
   (e2) means to generate a resultant error detection code (EDC) signature for each block of data transferred;
   (e3) means to compare said original EDC signature with said resultant EDC signature, and to generate an error signal if a mismatch occurs.

2. The system of claim 1 wherein each of said protocol-controller means includes means to receive a command from said main host computer to transfer "B" blocks of data and store said number "B" until "B" blocks have been transferred.

3. The system of claim 2 wherein said processor-controller means includes: (a) means to inhibit said counter means so as to transfer only the number, "R", of data blocks presently residing in said memory buffer means where "R" represents the number of uncompleted blocks needed to complete the full transfer of "B" blocks.

4. The system of claim 3 wherein said processor controller means includes:
   (a) means to remove accessibility to a channel bus means when said memory buffer means has no stored data blocks destined for that channel bus means.

5. The system of claim 1 wherein each of said protocol controller means includes:

(a) means to disable said integrity checking circuit means when data blocks without original error detection codes (EDC) are being transmitted.

6. A data feeder control and management system for the monitoring and supervision of multiple numbers of sender-receiver modules wherein a sender module transmits data organized in "B" blocks having "d" bytes including a header indicating the number "d" of bytes in each block and an original error detection code (EDC) for each block, each set of sender-receiver modules connected by a channel bus means, said system comprising:

(a) a multiple number of N sets of sender-receiver modules, each set connected by its own channel bus means;

(b) N integrity checking means operating on-the-fly for checking the parity of each byte of each word transferred on each of said N channel bus means and for checking the original error detection code (EDC) signature of each block transferred on each of said channel bus means, said checking means including:
   (b1) means to generate a resultant EDC for each block transferred for comparison with said original EDC block;
   (b2) means to signal an error signal to said processor-controller means when said EDC codes do not match.

(c) processor controller means connected to each of said channel bus means for regulating data transfers on each channel bus means, including:
   (c1) means to select any one of said multiple sets of sender-receiver units to set the prescribed amount of data to be transferred and to signal said processor-controller means when the prescribed amount of data has been transferred;

(d) N data feeder control means, each means including: counter controller means to register the amount of data transferred on each one of said sets of sender-receiver modules and to notify said processor-controller means when the prescribed amount of data has been transferred;

(e) means to interrupt and inform said processor-controller means when said prescribed amount of data transfer has been completed.

* * * * *